US012703820B2

(12) United States Patent
Jin et al.

(10) Patent No.: US 12,703,820 B2
(45) Date of Patent: Aug. 11, 2026

(54) METHOD FOR SUBSURFACE INJECTION CONFORMANCE IMPROVEMENT USING MICRO CALCIUM CARBONATE PARTICLES

(71) Applicant: Millcreek Capital Management LLC, Houston, TX (US)

(72) Inventors: Xiaochun Jin, Houston, TX (US); Quanxin Guo, Houston, TX (US)

(73) Assignee: Millcreek Capital Management LLC, Houston, TX (US)

( * ) Notice: Subject to any disclaimer, the term of this patent is extended or adjusted under 35 U.S.C. 154(b) by 0 days.

(21) Appl. No.: 18/486,855

(22) Filed: Oct. 13, 2023

(65) Prior Publication Data

US 2025/0122416 A1 Apr. 17, 2025

(51) Int. Cl.
*C09K 8/42* (2006.01)
*C09K 8/487* (2006.01)

(52) U.S. Cl.
CPC .............. *C09K 8/426* (2013.01); *C09K 8/487* (2013.01)

(58) Field of Classification Search
CPC ................................ C09K 8/426; C09K 8/487
See application file for complete search history.

(56) References Cited

U.S. PATENT DOCUMENTS

2010/0181073 A1* 7/2010 Dupriest .................. C09K 8/03 166/308.1
2019/0065640 A1* 2/2019 Singh ...................... E21B 43/00

OTHER PUBLICATIONS

Abdulaziz Ali Al Shuaibi et al. “A New Water Shut-Off Technology Using Sized Calcium Carbonate Particles in Safah Field, Oman.” Paper presented at the Middle East Oil, Gas and Geosciences Show, Manama, Bahrain, Feb. 2023. doi: https://doi.org/10.2118 /213489-MS. (Year: 2023).*
Kirkland, Catherine M. et al. “Addressing wellbore integrity and thief zone permeability using microbially-induced calcium carbonate precipitation (MICP): A field demonstration.” Journal of Petroleum Science and Engineering, vol. 190, No. 107060, (2020), https://doi.org/10.1016/j.petrol.2020.107060. (Year: 2020).*
A. A. Al Shuaibi et al. “A New Water Shut-Off Technology Using Sized Calcium Carbonate Particles in Safah Field, Oman” Society of Petroleum Engineers, SPE-213489-MS; Mar. 7, 2023 (10 pages).

* cited by examiner

*Primary Examiner* — Crystal J Lee
(74) *Attorney, Agent, or Firm* — Osha Bergman Watanabe & Burton LLP

(57) ABSTRACT

A method of shutting off injected fluid flow into the thief zones and of improving subsurface injection conformance using micro calcium carbonate particles includes estimating the pore size and fracture width of the thief zone, designing of a treatment program for the required calcium carbonate particle size, spectrum and concentration for plugging the pores and fractures, and creating a tight and deep-penetrating seal of low permeability over the thief zone, determining the post-treatment permeability of the seal and injected fluid flow rate profile before and after the treatment.

20 Claims, 3 Drawing Sheets

METHOD FOR SUBSURFACE INJECTION CONFORMANCE IMPROVEMENT USING MICRO CALCIUM CARBONATE PARTICLES

BACKGROUND

Oil and gas extracted and produced using the underground pressure present in the reservoir to force the oil and gas to the surface is known as primary recovery. Primary recovery is often insufficient to extract a substantial portion of the original oil in place (OOIP) from the reservoir. As oil and gas are produced from a reservoir, the pressure in the reservoir decreases, leading to a decline in production rates. A technique known as enhanced oil recovery (EOR) can help to maintain reservoir pressure, and increase oil production, preventing premature well abandonment and extending the life of the field.

The EOR technique involves subsurface injection of water, $CO_2$, water-alternating-gas, or water mixed with surfactant and polymeric chemicals into a reservoir through an injection well. The injected fluid then flows through the reservoir rock and displaces the oil towards the production wells to enhance oil production. This enhanced oil recovery technique using subsurface injection also applies to enhanced geothermal system (EGS) reservoir development for enhanced heat exchange and production.

The method for developing EGS reservoirs is to use hydraulic fracturing to create fractures in hot rock formations to serve as interconnected pathways between an injection well and a hot-water production well. The method works by injecting water into the hot rock under high pressure. The injected water circulates through the fractures and heats up. The hot water is then pumped back from the production well to the surface, where it can be used to generate electricity.

Injected fluid flow is governed by the path of least resistance. Subsurface reservoirs are often highly heterogeneous, especially fractured reservoirs. Reservoir formations or zones with high permeability and fractures are known as thief zones because they are the dominant fluid pathways. Injected fluid flow through thief zones can lead to rapid fluid or thermal breakthroughs to the production wells, resulting in thief zones being over-swept, while other areas of the reservoir are bypassed. This uneven flow profile, or poor injection conformance, results in a high rate of the injected fluid being produced back from the production well and a low rate of the injected fluid being used to produce oil or geothermal energy. Improving injection conformance can lead to most or all of the injected fluid being used for oil or geothermal production, which improves the economics and success of subsurface injection projects.

Subsurface injection profile and conformance can be improved by plugging and sealing thief zones with calcium carbonate particles, which shuts off injected fluid flow into the thief zone. Solid particles in the injected fluid can form bridges and blockages in the fractures and over the pores of the high-permeability streaks, increasing flow resistance in the thief zone and diverting injected fluid to targeted zones.

It is also important to control injection profile and avoid thief zones in carbon capture, utilization, and storage (CCUS). The method of subsurface injection conformance improvement using solid particles can also be used in CCUS projects to shut off or reduce injected $CO_2$ flow in thief zones, increasing project economics and integrity.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method of subsurface injection conformance improvement in an oil and gas or geothermal reservoir by plugging and sealing the thief zones using micro calcium carbonate particles and dissolvable fibers, that includes evaluation and characterization of the thief zone, the engineering and design of a treatment program such as the required particle size and spectrum, concentration, post-treatment permeability and other treatment parameters.

In another aspect, embodiments disclosed herein relate to a method of analyzing and evaluating the reservoir formation logs, tests and simulation results, well completion data, and geomechanics analysis and estimation for the pore size and the fracture width of the thief zones.

In yet another aspect, embodiments disclosed herein relate to a method of engineering and design of treatment for the required particle size, spectrum and concentration to plug pores and fractures of the known size, and the estimated post-treatment permeability.

Embodiments pertain to sized calcium carbonate particles are extremely small. The particles may have a mean particle size from 1 micron (μm) or less to no more than 140 microns (μm). The density may vary from 0.6 g/cc to 3 g/cc. The particle sizes may have a required spectrum that is optimal for forming low permeability seals. The solid particle concentration may be from 0.1% to 5% by volume or 0.2 to 50 pounds per barrel (lbm/bbl).

In one aspect, the method may consist of multiple batches of treatment with the first batch containing large calcium carbonate particles for plugging large fractures of the thief zone, the second batch containing medium calcium carbonate particles for plugging medium fractures and the third batch containing small calcium carbon particles for plugging small fractures and pores formed by the large particles, resulting in optimal and effective plugging and sealing the thief zone In one aspect, the wettability of the fine calcium carbonate particles may be different for different reservoirs.

Embodiments pertain to the calcium carbonate particles may further include other types of fracture-plugging materials such as fibers or secondary granular particles such as walnut or graphite for improvement of sealing performance, for example, for sealing extremely large fractures.

In one aspect, the plugging and sealing granular and fiber agents may be acid soluble or dissolvable through other means such as under certain temperature.

In another aspect, the extremely fine calcium carbonate particles may be advantageous in creating three-dimensional blockages of the thief zone and in improving both vertical and areal conformances.

Other aspects and advantages of the claimed subject matter will be apparent from the following description and the appended claims.

DETAILED DESCRIPTION

Embodiments of the present disclosure relate to use of extremely small calcium carbonate particles. The present inventors have found that extremely small particles can penetrate deeply into the thief zone and thus can plug and seal the thief zone in both the vertical and areal directions. Seals created by small particles have low permeability, resulting in much better injection conformance improvement, in addition to other benefits.

To define more clearly some key terms used herein, the following definitions are provided. To the extent that any definition or usage provided by any document incorporated herein by reference conflicts with the definition or usage provided herein, the definition or usage provided herein controls.

Subsurface injection refers herein to the method of injecting fluid into a reservoir through an injection well for enhanced oil and geothermal energy recovery from a production well. The injected fluid may be water or $CO_2$, water-alternating-gas, or water mixed with chemicals such as surfactant, polymer. The application may be for enhanced oil recovery, enhanced geothermal energy production, or for carbon capture, utilization and storage.

Thief zone refers herein to reservoir formation layer or zone where the injected fluid preferentially flows into, bypassing significant amounts of oil or geothermal zones. Fractured zones and high-permeability streaks are examples of thief zones. Fractures may be natural fractures or fractures created by injection either from high injection pressure or from thermal stress.

Sweep efficiency refers herein to the effectiveness with which the injected fluid displaces the oil to the production well. It is a measure of how well the injected fluid is spreading and sweeping the oil or geothermal within the reservoir.

Conformance refers herein to the degree to which the injected fluid follows the desired distribution profile along the reservoir formations or zones.

Particle spectrum refers herein to particle size distribution and various particle shapes.

As those having ordinary skill in the art will appreciate, different persons may refer to the same feature by different names. This document does not intend to distinguish between features that differ in name but not function. The figures are not necessarily drawn to scale. Certain features here may be shown in somewhat schematic form and some details may not be shown in the interest of clarity and conciseness.

Embodiments disclosed herein are directed to a method of increasing hydrocarbon or geothermal energy production rate by improving subsurface injection conformance and sweep efficiency using engineered calcium carbonate particles to plug and seal the thief zones and divert the injected fluid to the hydrocarbon or geothermal zones.

Figure 1:
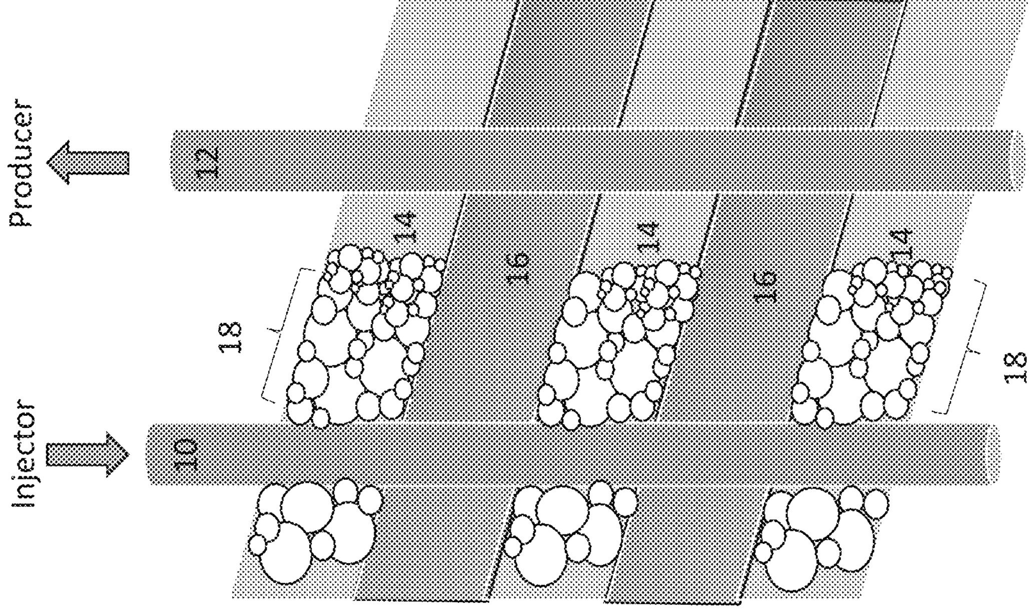
FIG. 1 is a schematic of an injector and a producer illustration subsurface injection conformance improvement by reducing injected fluid flow into fractures and high permeability pathways or thief zones.

Referring to FIG. 1, a schematic of a subsurface operation is shown. The method disclosed herein for subsurface injection conformance improvement applies to vertical, deviated or horizontal injectors. Generally, there is an injector 10 and a producer 12 with fractures and high permeability fluid pathways, often referred as thief zones, that run therethrough. Generally, the objective of subsurface injection operations is to use the injected fluid 10 to displace and sweep the oil or geothermal in the resource zones 16 towards production wells 12. However, when the subsurface reservoir has fractures and/or high permeability zones 14, the injected fluid flows, according to fluid flow physics, mainly sweeps into and through those high fluid pathways or thief zones 14 to the producers 12, resulting in rapid injected fluid or thermal breakthroughs and bypassing the remaining oil or geothermal zones 16. Rapid fluid or thermal breakthroughs result in the thief zones 14 being over-swept, while the remaining hydrocarbon or geothermal zones 16 are under-swept. In accordance with embodiments of the present disclosure, a treatment may be implemented to improve injection conformance and to increase oil or geothermal production rate by diverting injected fluid flow from the over-swept thief zones to the under-swept resource zones.

Embodiments disclosed herein relate to a method of shutting off fluid flow into the thief zones and diverting the injected fluid into the resource zones to increase injection conformance, resulting in increased sweep efficiency and oil or geothermal production rate. The method involves shutting off fluid flow into the thief zone with little or no damage to the resource zones by injecting carefully sized extremely small calcium carbonate particles to plug and seal the high fluid pathways 18. Those having ordinary skills in the art will appreciate that the thief zone plugging agents may include other materials such as fibers and secondary granular materials, for example, for thief zones having extremely large fractures, in addition to calcium carbonate particles. Following treatment, the plugged and sealed part 18 of the thief zones is deep and has low permeability so injected fluid 10 is diverted from over-swept zones 14 to under-swept zones 16 to push and sweep the remaining oil or geothermal to the production well 12.

One advantage of using extremely small calcium carbonate particles is that injected fluid can suspend and carry extremely small particles much better than larger particles deep into the thief zone. These extremely small particles can flow with the injected fluid wherever the fluid flows, resulting in deep-penetrating and three-dimensional blockages that prevent or reduce fluid flow. Therefore, the method herein using extremely small calcium carbonate particles can result in significant subsurface injection conformance improvement either in enhanced oil recovery or in enhanced geothermal systems.

Figure 2:
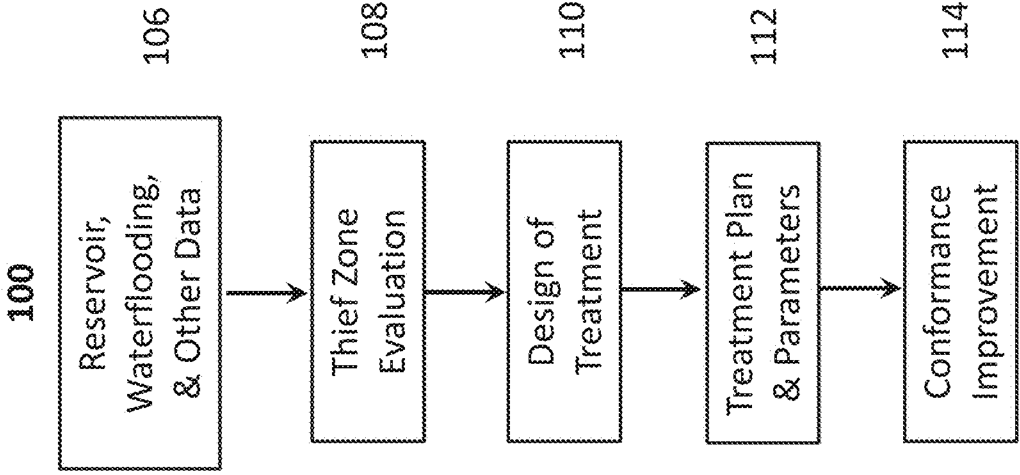
FIG. 2 is a process flow diagram in accordance with embodiments disclosed herein.

Referring to FIG. 2, a generalized process flow diagram of a method 100 in accordance with one or more embodiments is shown. In the embodiment shown in the figure, reservoir data, completion and injection history data, lab testing and field operation data and experience 106 are collected and analyzed to diagnose the problem. The reservoir data 106 collection may include well logs, well testing, core analysis, reservoir simulations and others. The injection history data 106 may include injection rate, pressure, ratio of injection rate to withdrawal rate, oil or geothermal production rate, producer response delay time between injection and production rates, and others. The reservoir, completion and injection data are collected, analyzed, and evaluated to estimate the properties of the thief zones such as the size and width of the factures, the pore size of the thief zones.

Following collection of data 106, pore size and fracture width of the thief zone are evaluated and estimated 108. To be able to engineer a treatment plan to improve subsurface injection conformance, estimating and defining the pore size and the fracture width of the dominant thief zones may occur. Evaluation and characterization of the thief zone of high permeability streaks and fractures 108 may be based on logs, well testing, core analysis and other testing or simulation results.

The pore size of the high permeability streaks may be obtained directly from imaging analysis of core samples or well logs. However, well logs or cores may not always be available. The pore size of the high permeability streak may also be estimated from its permeability, which may be almost always available. There are a number of techniques for estimating pore size from permeability known to those of ordinary skill in reservoir engineering and core analysis. As a first order estimation, the median pore size in microns (μm) may be estimated as 1 to 1.6 times of the square root of the permeability in milliDarcy (mD). Those having ordinary skill in the art will appreciate that the correlations provided herein between permeability and pore size are examples, and different correlation may be used, depending on rock types. A different correlation may be found to be more appropriate for a specific subsurface injection project. In those cases, the project-specific correlation should be used in estimating the pore size.

The fracture width of the fractured reservoir formation may be estimated directly again from well image logs or imaging analysis of core samples. Fracture width may be predicted using other information or measured directly. In the case of enhanced geothermal systems, it may be estimated from completion data and analysis. Those having ordinary skills in the art will appreciate that fracture width may be difficult to estimate accurately, and a range may have to be used. Given this consideration, the treatments of the present disclosure may use a size spectrum of calcium carbonate particles that are designed to cover a wide range of fracture widths.

In addition to fracture width, fracture length and height of the thief zone are also important in engineering and designing the treatment. The method herein of using extremely small calcium carbonate particles, as different from existing methods, is particularly effective for large fracture length and height of the thief zone, as extremely small particles can flow with injected fluid wherever the fluid flows, resulting in deep penetrating blockages of fluid pathways both in fracture length and fracture height directions. The blockage permeability created by smaller particles is lower than blockage permeability created by larger particles, resulting in better performance in shutting off injected fluid flow in the thief zone.

It should also be pointed out that a thief zone may have more than one fracture. Those fractures may have different length, height and width. Shutting off injected fluid flow into the thief zone requires plugging and sealing all those fractures. Thus, it is envisioned that a treatment plan may include multiple injection batches, with each batch containing a different size range of calcium carbonate particles targeting a different size of fracture.

Following estimation of fracture width, engineering and design of a treatment plan 110 may occur. Continuing to refer to FIG. 2, the engineering and design for treatment module 110 may include methods and computer programs for designing and recommending the optimal treatment plan for shutting off injected fluid flow in the thief zone by plugging and sealing the high permeability and fracture zones. Once the pore size and the fracture width of the thief zone is estimated from thief zone evaluation and characterization 108, the required particle size, spectrum and concentration may be designed to optimize subsurface injection conformance improvement using design tools and software in the engineering and design for treatment module 110.

The required median particle size for building bridges over the pores may be equal or larger than ⅓ of the median pore size of the high permeability streaks. The required median particle size for bridging and plugging fractures may vary from 0.5 to 0.9 times of the estimated average fracture width. The optimal particle size depends on the desired post-treatment permeability of the thief zone versus the permeability of the hydrocarbon or geothermal zone. The subsurface injection profile can be modified by plugging and changing the permeability or the fluid flow resistance of thief zones using multiple sizes of calcium carbonate particles because seals formed by smaller particles generally have lower permeability than seals formed by larger particles.

An effective treatment plan may consist of several batches of treatment using calcium carbonate particles of different size ranges. For example, in a first batch treatment, larger particles with a maximum median size of 140 μm, may be required to plug the larger fractures first before smaller particles are used to plug the smaller fractures and the pores formed by the large particles. In one or more embodiments, it is also understood that the first batch treatment may have a median size ranging from 10 to 140 μm, such as from a lower limit of any of 10, 20, 30, 40, or 50 μm to an upper limit of any of 100, 110 120, 130, or 140 μm, where any lower limit can be used in combination with any upper limit.

However, in a second batch treatment, it is often the best practice or required to complete the treatment with extremely small calcium carbonate particles, for example, with a median particle size of 10 μm or less, to form a tight seal over the thief zone. Moreover, it is also understood that the second batch treatment may have a median size of less than 10 μm, such as less than 10, 8, 6, 4, 2, or 1 μm. In some cases, additional nano particles may be added if the desired post-treatment permeability is extremely low. However, it is understood that the particle size is selected based on the considerations such as fracture width and post-treatment permeability described herein. Thus, in one or more embodiments, the treatment may include extremely small calcium carbonate particles, for example, with a median particle size of 10 μm or less, to form a tight seal over the thief zone, without a prior treatment with larger particles.

The recommended particle concentration may be from 0.5% to 5% by volume or 0.2 to 50 pound per barrel (lbm/bbl). At low concentration between 0.5% to 3%, the required treatment volume may be from hundreds of barrels to thousands of barrels or more, depending on the thief zone height and extent. At high concentration between 3% to 5%, the required treatment volume may be from tens of barrels to hundreds of barrels or more. Those having ordinary skill in the art will appreciate that high particle concentration may also reduce the required median particle size as higher particle concentration results in more chances for the particles to come together and form a bridge.

In addition to required particle size design, the engineering and design for treatment module 110 also include design for the size spectrum of the calcium carbonate particles. The optimal particle spectrum is required to create tight seals of desired permeability over the thief zones, preventing or dramatically reducing the injected fluid flow into the thief zones. The size spectrum of the particles may be critical for building bridges in the fractures and preventing fluid flow over them. Well sorted particles may bridge the fractures and form porous seals, but the injected fluid may still flow through the porous seal easily. Particle shape may also play an important role in the post-treatment permeability. Blocky shaped particles may be preferred to spherical shaped particles in building bridges and creating seals of low permeability. Optimal particle spectrum may be designed to create tight seals of desired post-treatment permeability.

Embodiments disclosed herein relate to a method of designing the optimal size spectrum of the calcium carbonate particles for forming tight seals and shutting off fluid flow into the thief zones, resulting in subsurface injection conformance improvement. The calcium carbonate particles should have a wide spectrum of particle sizes that have a desired size distribution. The particle size spectrum should form a straight-line when the percent of cumulative volume versus the power-x of the particle size is plotted, where x is between ½ and 1. Those having ordinary skills in the art will appreciate that the linear relationship between the percent of cumulative volume and the power-x of the particle size is approximated and obtained using the best curve-fit method or other methods.

Blocky shapes of calcium carbonate particles are more preferred as compared to spherical shapes of particles in terms of building bridges and forming seals in shutting off fluid flow in fractures. The shape spectrum of the calcium carbonate may include a range of different shapes for enhancing the conformance improvement performance in bridging the pores and fractures of the thief zone and in creating a tight and deep-penetrating seal of desired post-treatment permeability.

Embodiments disclosed herein relate to a method of engineering and designing the optimal treatment plan of shutting off fluid flow into the thief zones for subsurface injection conformance improvement. It was found that small calcium carbonate particles may be easily dispersed in the injected fluid. It was also found that certain calcium carbonate particles smaller than a few microns may have an apparent density less than water. Those small particles may flow easily with the injected fluid deep into the thief, resulting in deep penetration into the thief zones and creating long lasting subsurface injection conformance improvement.

Embodiments pertain to calcium carbonate particles may be especially effective for creating three-dimensional blockage of fractures using extremely small calcium carbonate particles. Some particles may be nano particles. Injected fluid can suspend and carry smaller particles much better than larger particles. Small particles can flow with the injected fluid to where the fluid flows, whether it is along the fracture length or along the fracture height, resulting in high-quality blockages of fluid pathways deep into the fracture length and wide across the fracture height of the thief zone.

As pointed out previously, a thief zone may have more than one fracture and those fractures may have different length, height and width. Shutting off fluid flow into the thief zone requires plugging and sealing all those fractures. The treatment plan may consist of several batches of treatment using different combinations of calcium carbonate particles having different size ranges. When the thief zone may contain fractures of different width, the injected fluid will flow into large fractures more easily than into small fractures. Larger particles are required to plug the larger fractures first before smaller particles are used to plug the smaller fractures. The optimal treatment of shutting off fluid flow into the thief zone may include a first batch of injection of slurry containing large calcium carbonate particles for plugging the large fractures, then a second batch of injection of slurry containing medium size particles for plugging the medium fractures, and finally a third batch of injection of slurry containing small size particles for plugging the small fractures and the pores in the seals formed by large particles to achieve desired post-treatment permeability.

Figure 3:
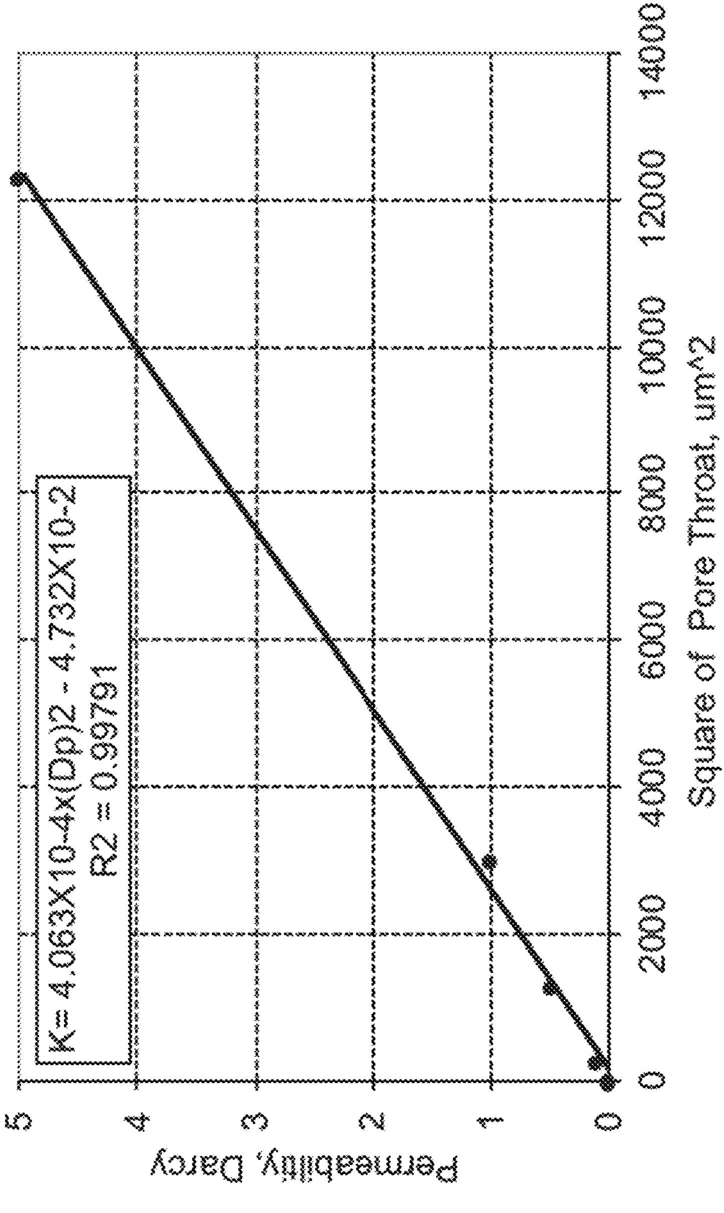
FIG. 3 is a graphical example generated in accordance with embodiments disclosed herein.

Embodiments disclosed herein relate to a method of estimating and predicting post-treatment permeability. Post-treatment permeability may be estimated from laboratory tests or from pore throat size of the seals created from the treatment. FIG. 3 shows a correlation between permeability and square of pore throat size. Those having ordinary skill in the art will appreciate that the correlation provided herein between permeability and pore throat size may be just one example, and that the correlation may be any correlation or relationship between permeability and pore size known in the art and may be used to estimate permeability from pore size or other known parameters known in the art. The correlation coefficient may vary from 0.4 to 1. This correlation may be used to estimate post-treatment permeability. The median pore throat size of the seal may be obtained as 0.5227 times the median particle size of the treatment. For example, if the median particle size of the treatment is 5 μm, the median pore throat of the seals from the treatment is about 2.6 μm. The post-treatment permeability is estimated to be about 3 to 7 mD. Those having ordinary skill in the art will appreciate that if a different correlation is found to be more appropriate for a specific subsurface injection project, then the project-specific correlation may be used in estimating the post-treatment permeability.

Embodiments disclosed herein relate to a method of adding secondary thief-zone blocking materials in the treatment plan for improving subsurface injection conformance of using calcium carbonate particles alone. Combination of fibers and calcium carbonate particles may be used for plugging and sealing especially large fractures. The fiber may be 10 mm or less in length. The fiber concentration in the treatment may be 0.2% to 2% by volume. Addition of fibers may also increase the particle suspension capacity in fluid.

The combination of secondary particles such as walnut and graphite particles with calcium carbonate particles may further reduce the permeability of the seal. Well sorted large secondary particles may be added to assist in building bridges over open fractures or large pores of high-permeability streaks. Once bridges are formed, the designed calcium carbonate particles can form seals more easily around the bridges, resulting in increased effectiveness of designed calcium carbonate particles. If necessary, the calcium particles may be dissolved, for example, using acid, to remove formation damage and to change post-treatment permeability.

One advantage of adding well sorted large secondary particles such as walnut or graphite is that they will cause little or no permeability reduction in hydrocarbon zones, while enhancing thief zone plugging performance of extremely small calcium carbonate particles. Smaller calcium carbonate particles are easier to be dissolved using acid than larger calcium carbonate particles. Once the small calcium carbonate particles are dissolved, the well sorted large secondary particles cause no permeability reduction beyond the thief zone.

Once the treatment is designed at 110, the treatment plan for subsurface injection conformance improvement 112 is obtained. The deliverables from the engineering design for treatment module 110 are a recommended treatment plan and optimized operational parameters for improving injection conformance and sweep efficiency for the specific project. The designed treatment plan and treatment parameters may include the required calcium carbonate particle size, spectrum, concentration, post-treatment permeability, depth of penetration, size of the treatment and others 112.

Then, a prediction of post-treatment injection conformance improvement 114 may be obtained. Embodiments disclosed herein relate to a method of predicting and estimating subsurface injection conformance improvement, injected fluid flow rate distribution over different zones, and estimating oil or geothermal production rate increase, ratio of injection rate to withdrawal rate and others 114.

As mentioned above, post-treatment permeability of the thief zones may be estimated from pore size of the seals created from the treatment. The median pore throat size of the seal over the thief zone may be obtained as 0.5227 times the median particle size of the treatment. Using the example provided previously, if the median particle size of the treatment is 5 μm, the median pore throat of the seals from the treatment is about 2.6 μm. The post-treatment permeability may be estimated to be about 3 to 7 mD in this example.

Once the post-treatment permeability in the thief zones is estimated, the injected fluid flow rate over the entire injection interval may be predicted either using reservoir simulators or other means. Sweep efficiency, oil or geothermal production rate increase, ratio of injection rate to withdrawal rate may also be predicted from reservoir simulators or other techniques.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112 (f) for any limitations of any of the claims herein, except for those in which the claim expressly uses the words 'means for' together with an associated function.

What is claimed is:

1. A method of improving subsurface injection conformance and sweep efficiency using extremely small calcium carbonate particles having a median particle size of about 1 μm to no more than 140 μm to shut off an injected fluid flow into thief zones within a subsurface reservoir and to divert the injected fluid to desired hydrocarbon, geothermal or carbon storage zones, the method comprising:

evaluating and diagnosing of the subsurface reservoir and the thief zones, thereby estimating and defining pore size and fracture width of the thief zone;

engineering and designing of a treatment plan for sealing pores and fractures of the thief zone, thereby determining the required calcium carbonate particle size, spectrum and concentration of the treatment plan;

introducing the calcium carbonate particles according to the treatment plan into the thief zones to create seals over the thief zones, wherein at least a portion of the calcium carbonate particles is non-spherical;

computing and estimating of a permeability of the created seals over the thief zone thereby predicting and defining post-treatment permeability; and determining injection conformance improvement, injected fluid rate distribution over different zones, and estimating oil or geothermal production rate increase, and a ratio of an injection rate to a withdrawal rate.

2. The method of claim 1, wherein the introducing comprises injecting the calcium carbonate particles according to the treatment plan into an injection well for enhanced oil recovery in oil and gas production, or for enhanced heat exchange and production in enhanced geothermal systems, or for carbon capture, utilization and storage.

3. The method of claim 1, further comprising, injecting water, $CO_2$, water-alternating-gas, or water mixed with surfactant or polymeric chemicals into an injection well.

4. The method of claim 1, further comprising, collecting of reservoir description data, subsurface injection history data and testing data for evaluating and defining the pore size and fracture width of the subsurface thief zones of fractures and high-permeability streaks.

5. The method of claim 4, wherein the pore size and fracture width are defined from well logs, core analysis and permeability, and combinations thereof.

6. The method of claim 1, wherein engineering and designing of the treatment plan further comprises engineering calcium carbonate particle size, spectrum and concentration, for shutting off injected fluid flow into the thief zones and diverting the injected fluid into desired hydrocarbon, geothermal or carbon storage zone.

7. The method of claim 6, wherein engineering calcium carbonate comprises one or more of calcium carbonate particle size, spectrum and concentration.

8. The method of claim 7, wherein the calcium carbonate particles are selected to have a size and shape spectrum that build bridges in the thief zones and create desired low-permeability seals over the thief zones.

9. The method of claim 7, wherein the treatment plan further comprises fibers and secondary granular materials.

10. The method of claim 9, wherein the secondary granular particles cause no permeability reduction in hydrocarbon or geothermal zones and the extremely small calcium carbonate particles are dissolvable using acid.

11. The method of claim 7, the method further comprising:

making a batch of slurry consisting of fluid, calcium carbonate particles and other optional fracture plugging agents according to the treatment plan;

pumping the slurry of fluid mixing with calcium carbonate particles into an injector;

recording a pumping rate and an injection pressure;

observing any injection pressure increase;

stopping pumping when the injection pressure reaches a pre-determined value or when the pumping of a design slurry volume is completed;

analyzing injection data to determine treatment efficiency; and evaluating injection conformance improvement and oil or geothermal production increase.

12. The method of claim 11, wherein the calcium carbonate particles have an apparent bulk density of at least 0.6 g/cc to no more than 3.0 g/cc.

13. The method of claim 11, wherein the calcium carbonate particles have a concentration of at least 0.5 to 5% by volume or 0.2 to 50 pound per barrel.

14. The method of claim 11, wherein the slurry volume ranges from tens of barrels to tens of thousands of barrels, with the volume selected based on the size and severity of the thief zones.

15. The method of claim 1, wherein the treatment plan comprises multiple batches of treatment with at least a first batch containing calcium carbonate particles with a median size ranging from 10 μm to 140 μm for plugging large fractures of the thief zones, and a second batch containing calcium carbonate particles with a median particle size of 10 μm or less for plugging medium fractures and pores in the seals formed by the first batch, resulting in plugging and sealing the thief zones.

16. The method of claim 1, further comprising: computing and optimizing the porosity and permeability of the created seals over the thief zones from the treatment plan.

17. The method of claim 1, further comprising: computing and simulating injected fluid flow rate profiles before and after the treatment plan.

18. The method of claim 1, wherein the treatment plan further comprises thief-zones plugging agents selected from fibers and/or secondary granular materials.

19. The method of claim 1, further comprising: selecting a wettability of the extremely small calcium carbonate particles based on the reservoir.

20. The method of claim 1, wherein the extremely small calcium carbonate particles create three-dimensional blockages of fluid pathways over the fracture length and width, and the height of the thief zones.

* * * * *